July 24, 1934.    H. L. SCHRECK    1,967,559
SHEAR DRIVING AND FEEDING MECHANISM
Filed June 18, 1932    2 Sheets-Sheet 1
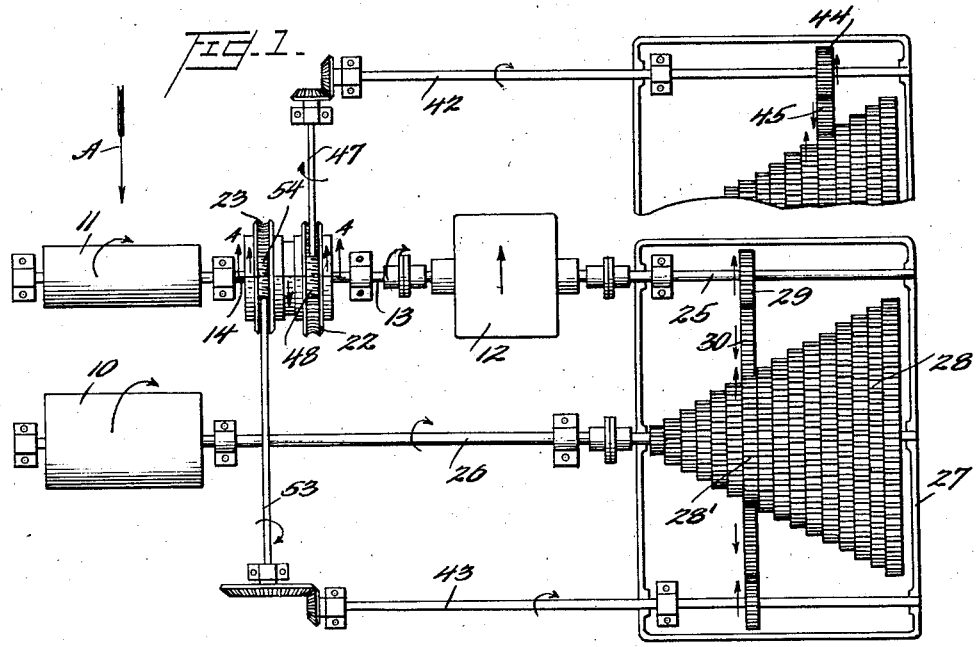
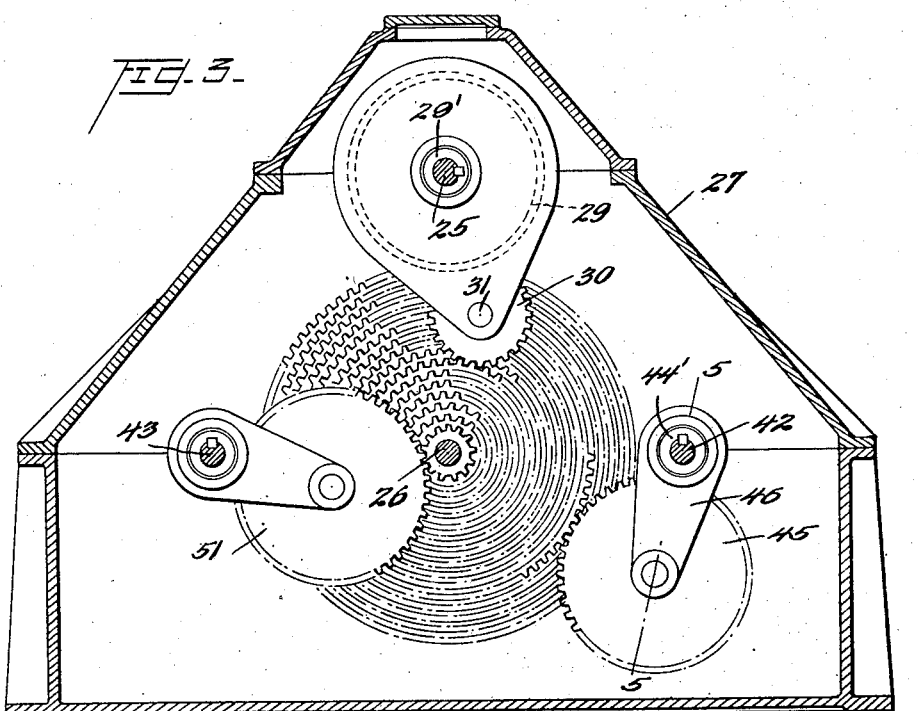

July 24, 1934.    H. L. SCHRECK    1,967,559
SHEAR DRIVING AND FEEDING MECHANISM
Filed June 18, 1932    2 Sheets-Sheet 2
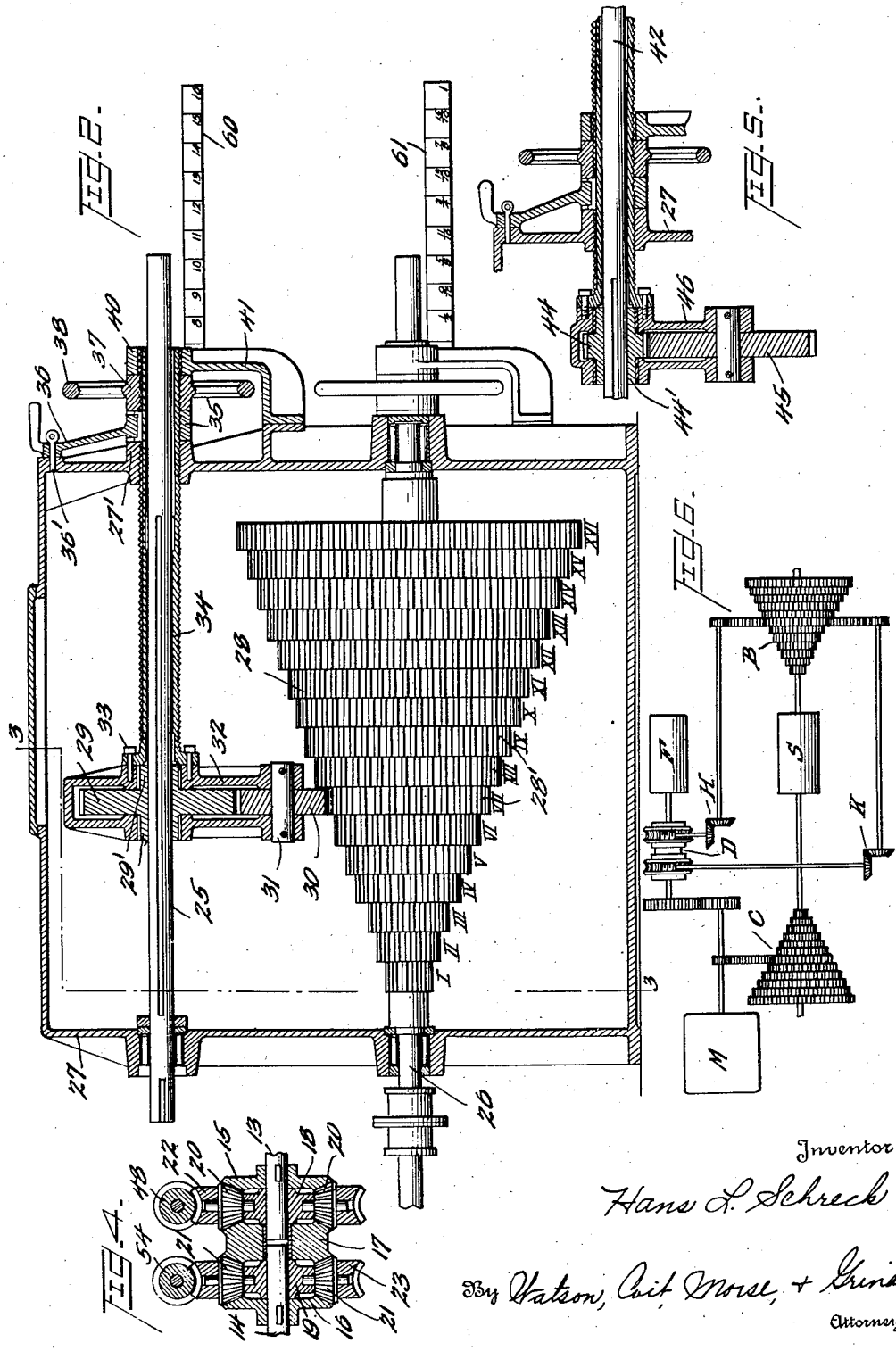

Patented July 24, 1934

1,967,559

UNITED STATES PATENT OFFICE 1,967,559

SHEAR DRIVING AND FEEDING MECHANISM

Hans L. Schreck, Easton, Pa., assignor to Treadwell Engineering Company, Easton, Pa., a corporation of Pennsylvania Application June 18, 1932, Serial No. 618,072

19 Claims. (Cl. 164—68)

The present invention relates to shear driving and feeding mechanisms and particularly to mechanisms of this type by means of which a shear and the means for feeding blanks thereto may be simultaneously and positively driven from a common power source.

The purpose of the invention is to provide a novel mechanism for driving shears of the type known as "flying shears", which act to sever into desired units an oncoming elongated blank while the blank is in motion, and to drive, simultaneously from the same source of power, the means which actually feeds the blank to the shear, the mechanism being so designed that the shear and the associated blank feeding means may be brought into very precise and definite cooperative relationship, and being also adjustable, so that a blank may be severed very accurately into units of any desired length, within the capacity of the machine.

Modern fabricators of articles made from sheets or strips often require that the sheets or strips delivered to them be very accurately cut to a specified length. Furthermore the length of the unit desired may not be measured exactly in feet but may be, and frequently is, measured in feet and fractions thereof, such as inches and fractions of inches. In accordance with the present invention, a shear driving and feeding mechanism is provided whereby the manufacturer of strips or sheets may not only accurately cut a blank into units of the desired length, and measured in feet, inches, and fractions of inches, but which mechanism furthermore is so positive in its action that no variation in length between the units of any one lot may occur, while at the same time being readily adjustable so that the shear operator can, after cutting a blank into a series of units of certain length, by a simple adjustment quickly and easily effected, modify the action of the shear driving and feeding mechanism in such manner tht it will cut accurately and quickly a second blank or series of blanks into units of a different length.

The length of any individual unit cut from an oncoming blank is, of course, determined by the relative speeds of action of the shear and the shear feeding means, the amount of material fed to the shear for each revolution of the shear determining the length of the unit cut. In accordance with the present invention, the ratio between the peripheral speed of the feed rolls and the speed of rotation of the shear may be very nicely and positively adjusted, and, once any such adjustment has been made, the mechanism will maintain such adjustment, cutting an oncoming blank into units of exactly the same length, until some further adjustment has been effected. By reason of the nature of the mechanism provided, there is no chance or opportunity for slippage between the parts, which might result in a blank being cut into units of unlike lengths when it is not so intended.

Finally, it frequently occurs that a flying shear may be advantageously placed closely adjacent the rolling mill in which the sheets or strips to be cut are originally fabricated. When so positioned, the blank sheets or strips are delivered to the shear at rolling mill speed, and it is desired that the feed rolls shall be so driven that their peripheral speeds are substantially the same as the linear speed of the oncoming blank and that the relative speed of the shear be increased or decreased to vary the lengths of the units into which the blank is cut. A shear driving and feeding mechanism constructed in accordance with the present invention may be utilized either in close cooperation with the mill or entirely independently, and its mode of operation remains the same in both instances. For the purpose of enabling the operator to accurately adjust the mechanism in such manner that the peripheral speed of the feed rolls is identical with the delivery speed of the blank from a rolling mill, the driving element, which may conveniently be an electric motor, is of the variable speed type.

By way of example, one preferred embodiment of the invention is illustrated in the accompanying drawings, together with a slightly modified form, but it will be appreciated that these two embodiments are set forth by way of example only and that the design and arrangement of the component elements of the improved shear driving and feeding mechanism may be greatly varied without departing from the spirit and scope of the invention in adapting the same to various locations and to the shearing of blanks which differ in character.

In the drawings:

Figure 1 is a rather schematic view showing diagrammatically a flying shear, feed rolls, and one form of the improved mechanism for driving the feed rolls and shear at the desired relative speeds;

Figure 2 is a longitudinal section through the gear box shown diagrammatically in Figure 1;

Figure 3 is a section on line 3—3 of Figure 2;

Figure 4 is a section on line 4—4 of Figure 1;

Figure 5 is a section on line 5—5 of Figure 3; and

Figure 6 is a schematic view of a somewhat modified form of mechanism.

The flying shear utilized may have any one of a number of specific forms but is preferably of the rotary type, having the ability to sever a rapidly moving sheet or strip without buckling the same or tearing the metal. Such a shear is indicated at 10 in Figure 1. The material to be severed into lengths is moved toward shear 10 in the direction of the arrow A, being supported by a suitable feed table which is not illustrated. Just prior to reaching the shear, the blank to be cut encounters and passes between a pair of pinch or feed rolls, the uppermost one of which is indicated diagrammatically at 11. These rolls are geared together for simultaneous rotation or, alternatively, may be independently driven at the same speed of rotation. The oncoming strip or blank is pinched between the feed rolls, and hence it is the ratio of the peripheral speed of the feed rolls to the speed of rotation of the shear shaft which determines the lengths of the units into which the blank is cut. This is, of course, well-known in the art, and the present invention relates to the means, hereinafter to be described, whereby the operator of the shear may accurately control and easily modify at will the length of material delivered to the shear for each shearing operation thereof.

Both the shear and the feed rolls are driven from a common power source or driving element, in this case an electric motor 12 of variable speed type. In some cases the motor may be positioned so that the axis of its rotor is coaxial with one or the other of the feed rolls 11, as shown in Figure 1, but in other instances it may be desirable to interpose between the motor and feed rolls reduction gearing in addition to that shown, so that it may not be possible to arrange the parts in this exact manner. A shaft 13, coaxial with the motor shaft and coupled thereto, terminates in close proximity to a spindle 14 formed integral with or rigidly secured to a feed roll 11. The driving connection between the driven feed roll 11 and the motor 12 is completed by the double differential gearing more clearly shown in Figure 4. This gearing includes a sun wheel 15 keyed to shaft 13, a sun wheel 16 keyed to shaft 14, a double sun wheel 17 which bridges the slight gap between shafts 13 and 14 and is mounted to freely revolve upon and about the common axis of these shafts, planet carriers 18 and 19, sets of planets 20 and 21, and rings 22 and 23, respectively, carried by the planet carriers 18 and 19 and the peripheries of which are toothed so that they comprise, in reality, worm wheels. Assuming the rings 22 and 23 to be locked against rotation, it follows that, when the motor 12 is in operation, shaft 14 will be driven at the same speed and in the same direction as shaft 13 is driven by the motor, and if shaft 13 is rotated in the direction of the arrow shown, the several sun wheels of the planet gearing and shaft 14 and the upper feed roll 11 will likewise be driven in the directions indicated by the several arrows. The bottom feed roll will, of course, be rotated in a direction opposite to the direction of rotation of the top feed roll but at the same peripheral speed.

The driving connection between the motor 12 and the shear 10 includes a motor driven shaft 25, a second shaft 26 preferably parallel to shaft 25, and a change speed gearing for operatively connecting these shafts, such gearing being most clearly shown in Figures 2 and 3. This change speed gearing is enclosed within a gear box 27 and comprises essentially a stepped cone 28 fixed on shaft 26, a spur gear 29 splined on shaft 25, and an idler 30 rotatably supported upon an arbor 31 and adapted to be brought into mesh with any one of a number of the individual gears 28' which, taken together, make up the stepped cone 28. From an inspection of Figure 2, it will be observed that arbor 31 has its ends supported in a frame 32 mounted upon axial cylindrical extensions 29' of gear 29 and rigidly connected by bolts 33 to the end of a sleeve 34 which projects without the gear box. Splined upon that portion of sleeve 34 which projects without the gear box is a hub 35 having a handle portion 36 by means of which the hub may be rotated about the axis of shaft 25 for the purpose of rotating sleeve 34 and hence effecting swinging movement of the frame 32 and idler gear 30 about the axis of shaft 25.

Threaded upon the exterior surface of the outwardly projecting portion of sleeve 34 and beyond the hub 35 is the hub 37 of a hand wheel 38. Hub 37 is held against axial movement relatively to the gear box inasmuch as one annular face engages the annular face of a bearing 40 supported on bracket 41, the inner annular face of hub 37 resting against the adjacent annular face of the aforementioned hub 35. Hub 35 in turn has its inner annular face in engagement with the outer face of a bearing 27' mounted in the wall of gear box 27. It follows that, upon rotation of the hand wheel 38, the sleeve 34 will be moved axially of shaft 25. Hence, after first manipulating the handle 36 to effect disengagement of the idler 30 from any gear 28' of the stepped cone with which it may be in mesh, the idler may be moved axially of the stepped cone and positioned in the plane of one of the other gears 28' of which this cone is built up. Upon actuation of handle 36 in the opposite direction, the idler 30 may be engaged with such gear. Any suitable means, such as a pin 36' which may be passed through registering apertures in handle 36 and the wall of gear box 27, may be used to lock sleeve 34 and hence hold idler 30 in mesh with one of the gears 28'.

The stepped cone is seen to comprise sixteen gears which gradually increase in diameter from one end of the cone to the other, all of these gears being fixed in close parallel relationship upon a shaft, the ends of which are mounted in roller bearings supported in the walls of the gear box 27 and one end of which is connected to shaft 26. With idler 30 in engagement with one of the gears 28', it follows that the shear driving shaft 26 is driven from shaft 25 and hence from motor 12.

Referring now more particularly to Figures 2 and 3, in which the several elements of the gearing are shown more accurately positioned than in the schematic Figure 1, it will be observed that shaft 25 in reality is positioned directly above the stepped cone 28 and that, in addition to shaft 25, there are two other shafts, one on each side of the stepped cone, one indicated at 42 and the other at 4. It will be noted that in Figure 1 shaft 25, which is aligned with the feed roll 11, is horizontally spaced from the shear driving shaft 26, whereas in Figures 2 and 3 these shafts are positioned in the same vertical plane. As has been before pointed out, Figure 1 is a diagrammatic view only, whereas Figures 2 and 3 are sections through a gear box which may be actually utilized as shown. Needless to say, Figure 1 does not truly illustrate the exact arrangement of shafts, etc., connecting the gear box, feed rolls, and shear which would actually be used in practice.

Again referring to the gear box shown in Figures 2 and 3, a pinion 44 is shown to be splined upon shaft 42, the teeth of which mesh with those of an idler 45 rotatably supported in bearings upon a swinging frame 46. Frame 46 is journaled upon cylindrical axial extensions 44' of gear 44, and connected to this frame is a sleeve similar to sleeve 34 which may be rotated and moved axially along shaft 42 by a lever and hand wheel similar to those utilized to manipulate sleeve 34 (see Figure 5). By this means large gear 45 may be brought into meshing engagement with one or another of gears 28' of the stepped cone. If the stepped cone is rotated while gear 45 is engaged therewith, shaft 42 will be driven and hence will drive shaft 47 (Figure 1) upon which is fixed a worm 48, the teeth of which mesh with the teeth of the ring gear 22 of the differential gearing. Similarly a pinion 50, splined on shaft 43, may be operatively connected to any one of the gears 28' by a swinging idler 51 so that shaft 43 may be driven by the stepped cone, if the stepped cone is in rotation, and hence shaft 53 rotated, shaft 53 having fixed thereon a worm 54 which is in mesh with the ring gear 23 of the differential gearing. Of course, the pinions 50 and 51 have associated with them elements corresponding to those designated 34—38 as in the case of pinions 29 and 30. The three shafts 25, 42, and 43 may, therefore, be simultaneously engaged with the stepped gear 28 if desired and may even be all operatively connected to the same gear 28' of the stepped gear since the several idlers 30, 45, and 51 move in different paths and at no time contact or conflict with each other.

The gears of the stepped gear are numbered I–XVI, inclusive, in the drawings. There may be any number of these gears, but, for reasons which will hereinafter become more clearly apparent, sixteen will suffice where it is desired that the apparatus shall have capacity to cut blanks into units which vary in length from each other by the sixteenth part of an inch. When idler 30 is in mesh with one of the gears 28', the shear 10 is operatively connected to the motor 12 and is driven thereby when the motor is operating. The speed of rotation of the shear relative to the speed of rotation of the shaft 25 will depend upon the relative diameters of gears 29 and 30 and the diameter of gear 28' with which gear 30 is in mesh. Gears 28' are so graduated that the diameter of gear II is twice that of gear I, the diameter of gear III is three times that of gear I, and so on, gear XVI having a diameter sixteen times as great as that of gear I. As a result, shaft 26 and the shear 10 may be driven at any one of sixteen different speeds from shaft 25, for any given motor speed, if the mechanism is so designed that gear 30 may be engaged with any one of the gears XVI. In the present instance, however, it is only intended that the gear 30 shall mesh with any one of gears VII, VIII, IX, X, XI, XII, XIII, or XIV as the machine disclosed in the drawings is intended to cut units, the lengths of which vary only between seven feet and fifteen feet, and hence it is unnecessary to so design the parts that gear 30 may mesh with stepped gears I, II, III, IV, V, and VI or gears XV and XVI.

The various gears are so designed, and the circumferences of the feed rolls are such that, when idler gear 30 is in mesh with stepped gear VII as shown in Figures 2 and 3, seven feet of the oncoming blank are fed by the feed rolls to the shear for each operation of the shear, and hence the blank will be cut into lengths of exactly seven feet. Should gear 30 be brought into operative engagement with gear VIII of the stepped cone, the blank will be cut into eight-foot units, and should it be brought into engagement with gear XIV of the stepped cone, the blank will be cut into fourteen-foot units. The operator is thus enabled to quickly adjust the apparatus so as to vary the lengths of the units, which are its product, from seven to fourteen feet as desired, when measured in even feet. During the time that any blank is in process of being sheared into units measured in even feet, gears 45 and 51 are out of engagement with the gears of the stepped cone, and hence shafts 42, 43, 47, and 53 as well as worms 48 and 54 are stationary. Ring gears 22 and 53 are, therefore, locked against rotation by the associated worms, as has been before explained.

Should it be desired to cut a blank into units which may be measured in feet and even inches, it is necessary to call additional mechanism into operation. Suppose, for instance, units having uniform lengths of 7' 6" are desired. In this case gear 30 is caused to mesh with stepped cone gear VII, and gear 45 is brought into mesh with stepped cone gear VI. Meshing of gear 45 with gear VI of the stepped cone does not result in any change in the speed of operation of the shear 10 (the motor speed remaining the same), but the speed of the feed rolls 11 is increased so that, for any one revolution of shear 10, six inches more material than before is fed between the feed rolls, and as a result the severed units measure 7' 6". This increased speed of the feed rolls is brought about by the action of gears 45 and 44, shafts 42 and 47, and worm 48, the ring gear 22 being revolved by worm 48 in a direction contrary to the direction of rotation of the sun gear 15, the planets 20 being thereby revolved about the axis of sun gears 15 and 17 in a direction contrary to the direction of rotation of sun gear 15, and the rotatory movement of the double sun gear 17 therefore being increased. Ring gear 23 being still locked, the sun gear 16 will rotate at the same speed as sun gear 17, and hence the speed of rotation of shaft 14 and of the feed rolls will be increased. If it be desired that the blank be severed into units measuring 7' 11", idler gear 45 is moved and brought into mesh with stepped cone gear XI, and as a result the double sun gear 17 is rotated still faster and the speed of the feed rolls increased the amount necessary to feed 7' 11" of material to the shear for each revolution of the shear.

If it is now desired to cut the blank into units of 7' 11 $\tfrac{9}{16}$", gears 30 and 45 are maintained in engagement with cone gears VII and XI, respectively, and idler gear 51 is brought into engagement with cone gear IX. This brings into action shafts 43 and 53, worm 54, and ring gear 23, the ring gear effecting revolution of planets 21 about the axis of shaft 14 in a direction contrary to the direction of rotation of the double sun gear 17 so that the speed of rotation of sun gear 16 is still further increased. If it be desired to cut a blank into lengths of 9' 9 $\tfrac{9}{16}$", all three gears 30, 45, and 51 are brought into mesh with stepped cone gear IX. It will be appreciated that gear 51 should be so designed and supported that it may be brought into engagement with any one of the sixteen stepped cone gears 28' as this gear controls the forward movements of the blank in increments of sixteenths of an inch. Gear 45 need only be brought into contact with stepped cone gears 28' varying from I-XII, inclusive. Gear 30 may, of course, be so supported that it may be brought into engagement with any one of the sixteen stepped cone gears if desired.

While the mechanism just described is so designed that blanks may be cut into lengths measured in feet, inches, and fractions of inches, it is obvious that, by redimensioning the gears and feed rolls, lengths measured in metric or other units may be severed from a blank. It will be understood, however, that no attempt has been made to illustrate, in the accompanying drawings, gears, pinions, etc., which are accurately dimensioned and that, so far as actual dimensions of the various parts are concerned, the drawings are to be considered diagrammatic only throughout. The differential mechanism employed may be formed in various ways, but that form illustrated and described, in which the planet carriers are arranged in parallelism and the sun gears are coaxial, is a very simple and efficient means for adding, to the rotatory movement of a shaft driven from a motor, additional revolutions, in order that the driven shaft may revolve at a desired increased speed.

In designing the means for taking power from the shear driving mechanism, (which for any one setting rotates at uniform speed) for the purpose of revolving a planet carrier, it should be kept in mind that a single revolution of a planet carrier about its axis in a direction contra to the direction of rotation of that sun gear which is driving the planets results in two additional revolutions of the driven sun gear and its associated shaft. Thus, assuming that the sun gear of the first differential of the double differential shown in the drawings is rotating in one direction at 100 revolutions per unit of time, and the first planet carrier is revolved upon its axis 5 revolutions in the same time, the driven sun gear (which is the double sun gear 17) will be rotated 110 revolutions. Also, if during this time the second planet carrier is revolved ½ revolution in a direction contra to the direction of rotation of the double sun gear 17, one additional revolution is imparted to the driven sun gear, making 111 revolutions of the driven shaft for each 100 revolutions of the drive shaft. Naturally, by rotating a planet carrier in the same direction as the sun gear which is driving it, the number of revolutions of the driven sun gear will be decreased instead of increased, but it is preferred to add to, rather than subtract from, the normal rotational speed of the driven shaft.

All of the foregoing adjustments may be made without regard to the absolute speed of rotation of the motor armature. It may result, therefore, that, after adjustment of the mechanism in such manner that units of a certain length are to be cut, the peripheral speed of the feed rolls will be different from the linear speed of an oncoming blank delivered by a rolling mill in those cases where the mechanism just described is positioned to receive the product of such a mill. If this proves to be the case, the speed of the motor may be increased or decreased until the peripheral speed of the feed rolls is exactly the same as the linear speed of the oncoming blank. I prefer to utilize, in combination with the mechanism just described, a feed roll synchronizing mechanism such as described in my copending application, Serial No. 595,199, filed February 25, 1932, by means of which the speed of the feed or pinch rolls may be accurately regulated in accordance with the feed of the blank so that the operator is not delayed in effecting this adjustment. For the convenience of the operator in adjusting the several idler gears, three scales, two of which are indicated at 60 and 61, respectively, are provided, there being such a scale disposed parallel to each of the shafts 25, 42, and 43 and mounted conveniently on the gear box 27. In making the adjustments, it is only necessary for the operator to observe the position of the end of a sleeve, such as sleeve 34, upon the associated scale in order that he may know accurately the position of the idler gear within the gear box.

It is not necessary that the invention be embodied in a mechanism the various elements of which are arranged in the manner indicated in Figures 1 to 5 of the drawings. For instance, a somewhat different arrangement is shown diagrammatically in Figure 6. Here the motor M is connected to the shear S through a speed changing gearing indicated at C, and the feed rolls F are connected to the motor through a driving connection including the double differential gearing D. Rotation of the shear is communicated to a stepped cone B, and power is taken from this cone to actuate the ring gears of the double differential by the driving connections H and K. As in the case of the first form of the invention disclosed, the speed changing device C may be set to give the number of even feet of blank which is fed to the shear for each revolution of the shear, and the gearing associated with cone B may be set to add to this length the additional inches and fractions of inches desired.

Still other embodiments of the invention may be devised to suit special operating conditions, the invention being nowise limited to the two structures shown and described.

Having thus described the invention, what is claimed as new and desired to be secured by Letters Patents is:

1. The combination with a flying shear and feed rolls therefor, of a single driving element and separate driving connections between said element and the shear and feed rolls respectively, one of said driving elements including a differential gear through which motion is transmitted, and means for taking power from the other driving connection to revolve the planets of said differential, for the purpose set forth.

2. The combination with a flying shear and feed rolls therefor, of a driving element, separate driving connections between said element and the shear and feed rolls respectively, the driving connection to the feed rolls including a differential gear through which motion is transmitted from sun gear to sun gear, and means for taking power from said driving element and applying it to the differential to effect revolution of the planets of said differential.

3. The combination with a flying shear and feed rolls therefor, of a driving element, separate driving connections between said element and the shear and feed rolls respectively, the driving connection to the feed rolls including a differential gear through which motion is transmitted from sun gear to sun gear, and means independent of the feed roll driving connection for effecting revolution of the planet gears of said differential or locking the same against revolution as desired.

4. The combination with a flying shear and feed rolls therefor, of a driving element, separate driving connections between said element and the shear and feed rolls respectively, the driving connection to the feed rolls including a differential gear through which motion is transmitted from sun gear to sun gear, a worm wheel mounted on the planet carrier of said differential, a worm meshing with said worm wheel, and means for rotating said worm at measured angular velocities.

5. The combination with a flying shear and feed rolls therefor, of a driving element, separate driving connections between said element and the shear and feed rolls respectively, the driving connection to the feed rolls including a differential gear through which motion is transmitted from sun gear to sun gear, a worm wheel mounted on the planet carrier of said differential, a worm meshing with said worm wheel, and means for taking motion from the shear operating driving connection for rotating said worm.

6. The combination with a flying shear and feed rolls therefor, of a driving element, separate driving connections between said element and the shear and feed rolls respectively, the driving connection to the feed rolls including a differential gear through which motion is transmitted from sun gear to sun gear, a worm wheel mounted on the planet carrier of said differential, a worm meshing with said worm wheel, and means for taking motion from the shear operating driving connection for rotating said worm, said means comprising a change speed gearing whereby the speed of rotation of the worm may be changed at will.

7. The combination with a flying shear and feed rolls therefor, of a driving element, separate driving connections between said element and the shear and feed rolls respectively, the driving connection to the shear including a change speed gearing and the driving connection to the feed rolls including a differential gear, and means connecting the change speed gearing and the differential gear for effecting revolution of the planets of said differential.

8. The combination set forth in claim 7 in which said change speed gearing includes a step cone and said means includes a shiftable gear which may be engaged with any one of a plurality of gears of said step cone.

9. The combination with a flying shear and feed rolls therefor, of a driving element, separate driving connections between said element and the shear and feed rolls respectively, each of said driving connections including a change speed gear, and an operative connection from one of said change speed gears to the other for varying the relative speed of said shear and said feed rolls.

10. The combination with a flying shear and feed rolls therefor, of a driving element, a change speed gear disposed between said driving element and said shear, a change speed gear disposed between said driving element and said feed rolls, and controlling means for one of said change speed gears directly associated with and driven by the other of said change speed gears.

11. The combination with a flying shear and feed rolls therefor, of a driving element, driving connections between said driving element and said rolls and said shear respectively, one of said connections including a variable speed gear, and a plurality of operative connections between said variable speed gear and said other driving connection whereby speed changes of varying degree of fineness may be applied to said change speed gear.

12. The combination with a flying shear and feed rolls therefor, of a driving element, a driving connection between said driving element and said feed rolls which includes a variable speed gear, a driving connection between said driving element and said shear, and a plurality of operative connections between said variable speed gear and said second named driving connection whereby speed changes of differing degrees of fineness may be applied to said feed rolls in order to vary the length of material cut by the shear.

13. The combination with a flying shear and feed rolls therefor, of a driving element, separate driving connections between said element and the shear and feed rolls respectively, one of said driving elements including a variable speed gear and the other of said driving connections including a cone of stepped gears, a pinion selectively engageable with said stepped gears, and operative connections between said pinion and said change speed gear to vary the relative speeds of the feed rolls and shear.

14. The combination with a flying shear and feed rolls therefor, of a driving element, separate driving connections between said element and the shear and feed rolls respectively, one of said driving elements including a variable speed gear and the other of said driving connections including a cone of stepped gears, a plurality of pinions selectively engageable with said stepped gears, and operative connections between said pinions and said change speed gear whereby speed changes of differing degrees of fineness may be applied to said change speed gear to vary the relative speed of the shear and pinch rolls in order to regulate the length of material cut by the shear.

15. The combination with a flying shear and feed rolls therefor, of a driving element, separate driving connections between said element and the shear and feed rolls respectively, one of said driving connections including a variable speed gear comprising a multiple differential, and a plurality of operative connections between the other of said driving connections and certain movable elements of the multiple differential whereby speed changes of differing degrees of fineness may be applied to said differential.

16. The combination with a flying shear and feed rolls therefor, of a driving element, separate driving connections between said element and the shear and feed rolls respectively, one of said driving connections including a variable speed gear comprising a planetary differential having a plurality of planet carriers and the other of said driving connections including a cone of stepped gears, a plurality of pinions selectively engageable with said stepped gears, and operative connections between said pinions and said planet carriers respectively whereby speed changes of varying degrees of fineness may be applied to said differential from said second driving connection.

17. The combination with a flying shear and feed rolls therefor, of a driving element, separate driving connections between said element and the shear and feed rolls, the driving connection for the feed rolls including a multiple planetary differential having a plurality of planet carriers and the driving connection for the shear including a cone of stepped gears and a pinion selectively engageable with said gears for varying the shear drive, additional pinions associated with said driving connection and selectively engageable with said stepped gears, and operative connections between said pinions and said planet carriers whereby speed changes of differing degrees of fineness may be applied to said differential.

18. In a device of the class described, in combination, a flying shear, feed rolls by means of which a strip of material may be fed to said shear at predetermined rates to control the lengths into which said strip is cut, common driving means for said feed rolls and said shear, a change speed gear disposed between said driving means and said rolls for varying the linear speed of said rolls and thus the lengths of cut by definite increments, and another change speed means also disposed between said driving means and said rolls and actuated by said shear for varying said speed and lengths of cut by smaller increments.

19. In a device of the class described, in combination, a flying shear, feed rolls by means of which a strip of material may be fed to said shear at predetermined rates to control the lengths into which said strip is cut, common driving means for said feed rolls and said shear, a plurality of change speed gear devices disposed between said driving means and said rolls, each adapted to vary the linear speed of the rolls and thus the lengths of cut by definite increments, and separate means actuated by said shear for controlling said change speed gears, one of said means adapted to vary the speed of the rolls by coarse increments and the other by finer increments.

HANS L. SCHRECK.